United States Patent
Otsuki et al.

[11] Patent Number: 5,563,484
[45] Date of Patent: Oct. 8, 1996

[54] THREE-DIMENSIONAL CUTTER COMPENSATION SYSTEM

[75] Inventors: Toshiaki Otsuki; Haruhiko Kozai; Hideo Ogino, all of Minamitsuru-gun, Japan

[73] Assignee: Fanuc Limited, Yamanashi, Japan

[21] Appl. No.: 397,202

[22] PCT Filed: Jul. 7, 1994

[86] PCT No.: PCT/JP94/01117

§ 371 Date: Mar. 7, 1995

§ 102(e) Date: Mar. 7, 1995

[87] PCT Pub. No.: WO95/03565

PCT Pub. Date: Feb. 2, 1995

[30] Foreign Application Priority Data

Jul. 20, 1993  [JP]  Japan ..................... 5-178729

[51] Int. Cl.⁶ ................................. B23B 39/26
[52] U.S. Cl. ............... 318/568.15; 318/573; 364/474.34; 364/474.31
[58] Field of Search ............. 318/568.15, 568.1, 318/568.19, 573, 572; 364/474.31, 474.18, 474.36, 474.28, 474.34

[56] References Cited

U.S. PATENT DOCUMENTS

| | | | |
|---|---|---|---|
| 3,709,094 | 1/1973 | Laux | 409/132 |
| 4,629,860 | 12/1986 | Lindbom | 219/125.1 |
| 4,659,265 | 4/1987 | Kishi et al. | 318/572 |
| 5,043,554 | 8/1991 | Kohsaka et al. | 219/121.39 |
| 5,216,344 | 6/1993 | Sasaki et al. | 318/568.15 |
| 5,282,144 | 1/1994 | Kawamura et al. | 364/474.31 |

FOREIGN PATENT DOCUMENTS 2-260004  10/1990  Japan.
4-74205   3/1992  Japan.

*Primary Examiner*—John W. Cabeca
*Attorney, Agent, or Firm*—Staas & Halsey

[57] ABSTRACT

A three-dimensional cutter compensation system provides cutter compensation for machining a workpiece with a cutter having a round edge and an axis which is tiltable in any optional direction in three-dimensional space. The three-dimensional cutter compensation system includes a cutter direction vector calculating unit for calculating a cutter direction vector from present position control axes. The control axes control the tilt of the cutter. A cutter offset memory stores a radius of the cutter and a radius of an arc of the edge of the cutter while a programmed path calculating unit calculates a programmed path commanded by a machining program. A cutter compensation vector calculating unit calculates a cutter compensation vector from the cutter direction vector, the radius of the cutter and the radius of the arc of the edge of the cutter, and the programmed path. The cutter is then shifted in response to the cutter compensation vector.

9 Claims, 9 Drawing Sheets

| D | | R |
|---|---|---|
| 1 | 10 | 2 |
| 2 | 50 | 5 |
| 3 | 30 | 3 |
| 4 | 40 | 0 |
| ⋮ | ⋮ | ⋮ |

FIG. 5

THREE-DIMENSIONAL CUTTER COMPENSATION SYSTEM

TECHNICAL FIELD

The present invention relates to a three-dimensional cutter compensation system for use with a numerically controlled machine tool, and more particularly to a three-dimensional cutter compensation system for use in machining a workpiece with an edge of a cutter having a round tip end while the axis of the cutter is being tilted in any optional direction in a three-dimensional space.

BACKGROUND ART

Numerically controlled machine tools which operate only about X-, Y-, and Z-axes have a cutter axis that is oriented always in a vertical direction, i.e., in any of the axis directions. If two rotational axes are added to such a numerically controlled machine tool, making it a 5-axis numerically controlled machine tool, then the cutter axis may be oriented in any optional direction. For example, a 5-axis diesinking machine can machine a workpiece three-dimensionally with a cutter that can be tilted in any optional direction.

A process of three-dimensionally machining a workpiece with a cutter includes a mode in which the cutter is tilted and the workpiece is machined by an edge of the cutter. In such a mode, a cutter compensation vector is required to be determined as a three-dimensional vector. Heretofore, there have been available different methods of determining a cutter compensation vector as a three-dimensional vector.

According to the first method, an automatic programming apparatus is used to calculate a cutter compensation vector. When the automatic programming apparatus generates a machining program, it simultaneously calculates a cutter compensation vector for automatically determining a cutter path which has been compensated for.

The second method relies upon an NC programmer to calculate the tilt of a cutter, an amount of compensation, and a direction of compensation when a machining program is generated.

The first method which employs an automatic programming apparatus has the following problems: Since the first method needs an automatic programming apparatus at all times, the overall system is expensive. Therefore necessary for the automatic programming apparatus to generate a machining program each time the cutter radius changes.

The second method in which calculations are carried out by an NC programmer is also disadvantageous for the following reasons: When a workpiece surface to be machined varies, i.e., when a curved surface is to be machined, a very large number of calculations is required, and program commands are highly complex, resulting in a large expenditure of time and labor to generate a machining program.

The above methods of determining a cutter compensation vector are also more complex if the cutter has a round edge as with an end mill.

SUMMARY OF THE INVENTION

In view of the aforesaid problems, it is an object of the present invention to provide a three-dimensional cutter compensation system capable of effecting cutter compensation with respect to cutters including a cutter with a round edge, for machining a workpiece with an edge of a cutter while the axis of the cutter is being oriented in any optional direction in three-dimensional space.

To achieve the above object, there is provided a three-dimensional cutter compensation system for use with a numerically controlled machine tool for machining a workpiece with an edge of a cutter while an axis of the cutter is being tilted in any optional direction in three-dimensional space, comprising cutter direction vector calculating means for calculating a cutter direction vector from present positions of a control axes which controls tilt of the cutter, a cutter offset memory for storing a radius of the cutter and a radius of an arc of an edge of the cutter, programmed path calculating means for calculating a programmed path commanded by a machining program, and cutter compensation vector calculating means for calculating a cutter compensation vector from the cutter direction vector calculated by the cutter direction vector calculating means, the radius of the cutter and the radius of the arc of the edge of the cutter which are stored in the cutter offset memory, and the programmed path calculated by the programmed path calculating means, and for outputting the calculated cutter compensation vector to interpolating means.

The cutter direction vector calculating means calculates tilt of the cutter, i.e., the cutter direction vector, from the positional information of the axes which control the tilt of the cutter. If the tilt of the cutter is controlled by a B-axis and a C-axis, then the cutter axis direction is determined based on the present positions of the B- and C-axes.

The programmed path calculating means then calculates the direction in which the cutter is to travel. The cutter compensation vector calculating means calculates a cutter compensation vector to shift the cutter onto a line at the intersection of a plane formed by the cutter axis direction and the direction of travel of the cutter and a plane perpendicular to the cutter axis direction, by a distance which is determined taking into account the radius of the cutter and the radius of the arc of the edge of the cutter. The cutter compensation vector calculating means then instructs the interpolating means to shift the cutter according to the cutter compensation vector.

BRIEF DESCRIPTION OF THE DRAWINGS

FIG. 5 i s a diagram showing an example of a cutter offset memory which stores cutter offsets;

BEST MODE FOR CARRYING OUT THE INVENTION

An embodiment of the present invention will hereinafter be described below with reference to the drawings.

Figure 1:
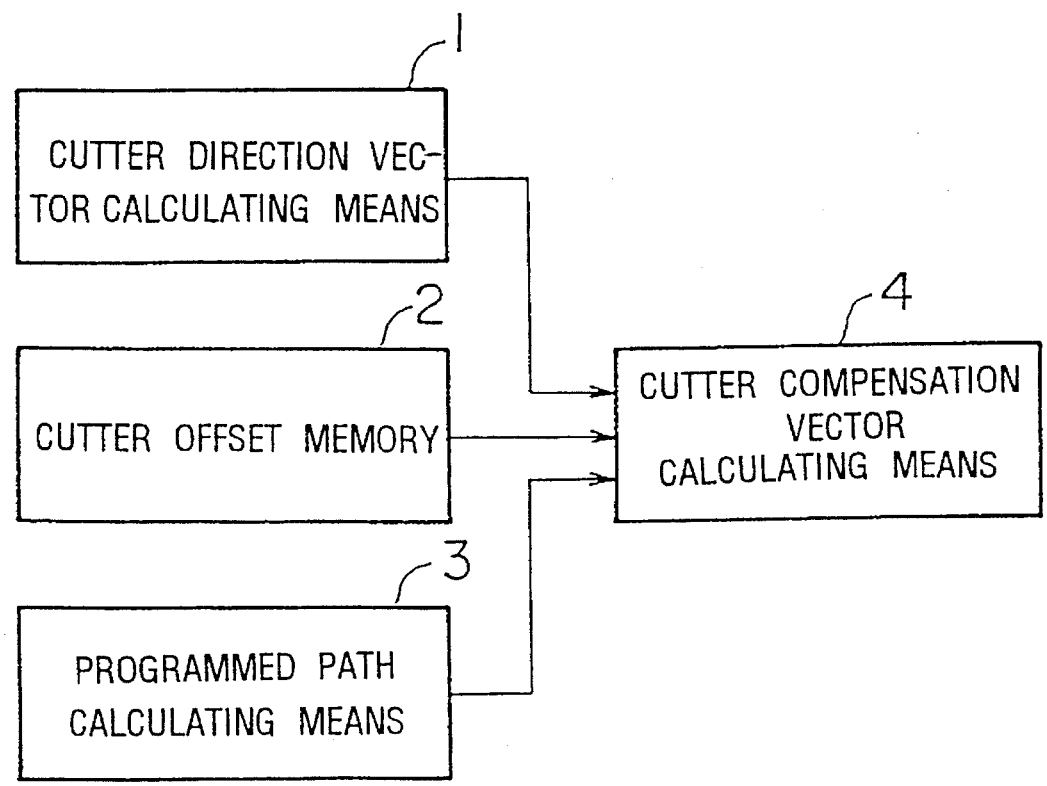
FIG. 1 is a block diagram showing the principles of the present invention.

FIG. 1 shows the principles of the present invention. In FIG. 1, a cutter compensation system according to the present invention comprises a cutter direction vector calculating means 1, a cutter offset memory 2, a programmed path calculating means 3, and a cutter compensation vector calculating means 4.

The cutter compensation system according to the present invention as shown in FIG. 1 operates as follows: The cutter direction vector calculating means 1 reads positional information of axes for controlling the tilt of a cutter and calculates a cutter direction vector relative to the tilt of the cutter. The programmed path calculating means 3 calculates a direction in which the cutter is to travel from a machining program. The cutter compensation vector calculating means 4 reads the radius of the cutter and the radius of an arc of the edge of the cutter which are stored in the cutter offset memory 2, and calculates a cutter compensation vector which exists on a line at the intersection of a plane which is formed by a cutter axis direction that is determined by the cutter direction vector calculating means 1 and the direction of travel of the cutter that is determined by the programmed path calculating means 3, and a plane lying perpendicularly to the cutter axis direction. In the cutter offset memory 2, the radius of the arc of the edge of the cutter is set to zero if the cutter does not have a round edge. The same calculation formulas as with a cutter with a round edge are applied to the above calculations.

Figure 2:
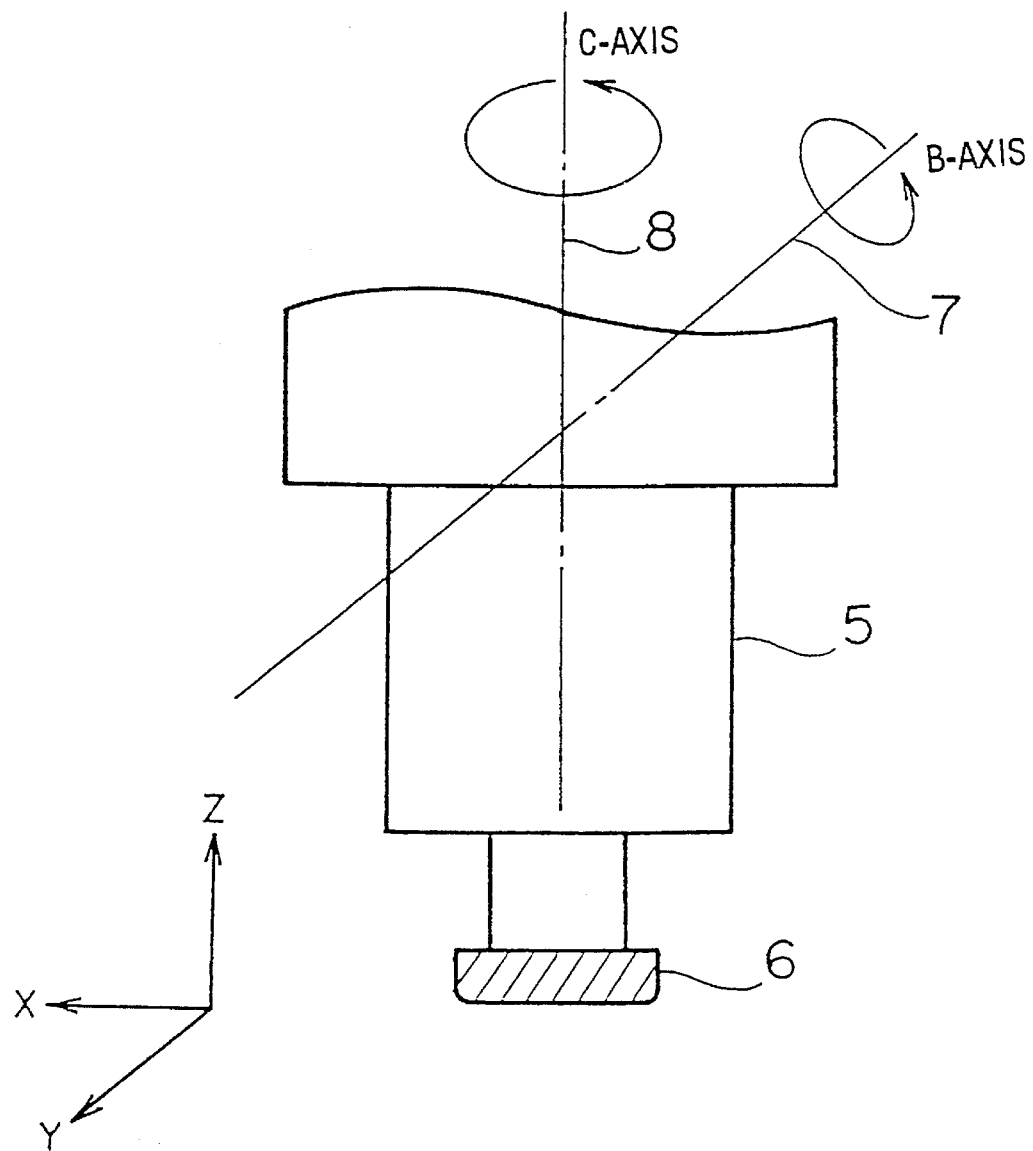
FIG. 2 is a view of a rotary head which carries a cutter of a machine tool such as a 5-axis diesinking machine.

FIG. 2 shows a rotary head which carries a cutter of a machine tool such as a 5-axis diesinking machine. A cutter 6 which may be an ordinary end mill or an end mill with a round edge is mounted on the tip end of a rotary head 5. The cutter 6 can move along X-, Y-, and Z-axes which are perpendicular to each other, and also rotate about an axis parallel to the Y-axis, i.e., a B-axis 7, and about a C-axis 8 parallel to the Z-axis. Therefore, the axis of the cutter 6 can be oriented in any optional direction in a three-dimensional space.

Therefore, the tool 6 can be tilted in any optional direction in the three-dimensional space by rotating the tool 6 about the B-axis 7 and the C-axis 8. The machine tool can thus machine a workpiece with an edge of the cutter 6 when the cutter 6 is tilted. To machine a workpiece with an edge of the cutter 6, it is necessary to calculate and give a cutter compensation vector depending on the tilt of the cutter 6.

A method of carrying out calculations for cutter compensation to allow the cutter 6, such as an end mill with a round edge, to machine a workpiece with its edge will be described below.

Figure 3:
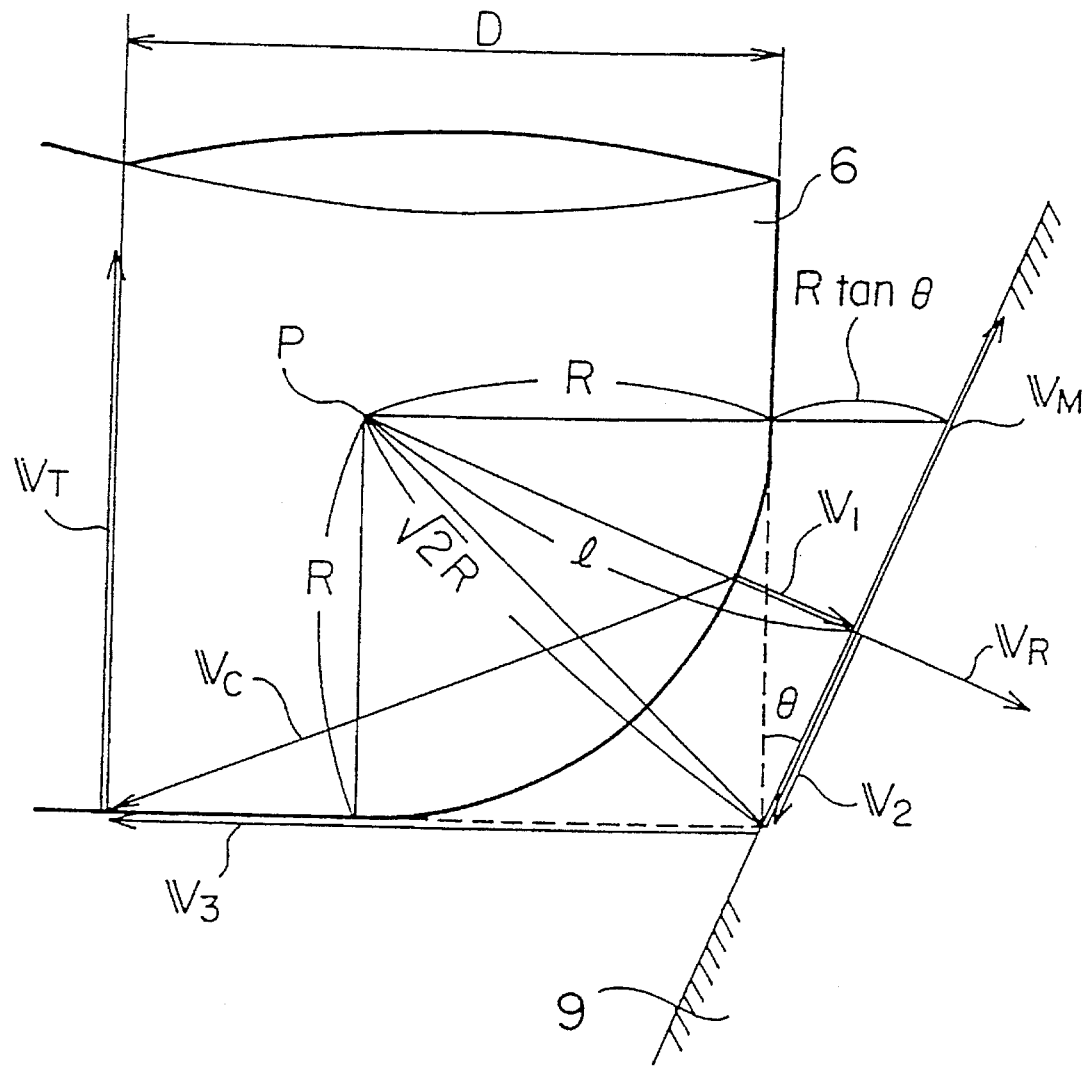
FIG. 3 is a view illustrative of an example of calculating a cutter compensation vector with a cutter compensation system according to the present invention.

FIG. 3 is illustrative of an example of calculating a cutter compensation vector with a cutter compensation system according to the present invention. In FIG. 3, the edge of the cutter 6 is shown exaggerated for illustrative purpose. The cutter 6 is shown as tilted at a certain angle with respect to a workpiece 9. For example, FIG. 3 illustrates a condition represented by:

$$(V_M, V_T) \geq 0, \quad (1)$$

i.e., a condition in which the angle θ formed between the cutter 6 and the workpiece 9 is 90 degrees or less, where $V_M$ represents a motion vector, i.e., a unit vector in a direction to move to a next block, which interconnect a present position and a next terminal position, $V_T$ represents a unit vector in the cutter axis direction, i.e. a cutter direction vector, and (,) represents an inner product.

In FIG. 3, $V_R$ indicates a vector extending perpendicularly to the motion vector from a center P of an arc having a radius R of the cutter 6 which has a radius D. The vector $V_R$ is equal to:

$$(V_M \times V_T) \times V_M \quad (2)$$

where × represents an outer product.

$V_C$ in FIG. 3 indicates a cutter compensation vector to be determined.

To determine the cutter compensation vector $C_C$, the following equation may be calculated:

$$V_C = V_1 + V_2 + V_3. \quad (3)$$

An example of such calculations will be described below. First, a vector $V_1$ is determined. If it is assumed that $l$ represents the distance from the center P of the arc having the radius R to the workpiece 9, then, using $$\cos \theta = (V_T, V_M) \quad (4a)$$

$$\sin \theta = V_T \times V_M \quad (4b)$$

$$l = (R + R \cdot \tan \theta) \cdot \cos \theta \quad (4c)$$

the magnitude of the vector $V_1$ is determined as follows:

$$\begin{aligned}
|V_1| &= l - R \quad (5) \\
&= (R + R \cdot \tan \theta) \cdot \cos \theta - R \\
&= R\{(1 + \tan \theta) \cdot \cos \theta - 1\} \\
&= R\left\{\left(1 + \frac{\sin \theta}{\cos \theta}\right) \cdot \cos \theta - 1\right\} \\
&= R\{\cos \theta + \sin \theta - 1\} \\
&= R\{(V_T, V_M) + |V_T \times V_M| - 1\}.
\end{aligned}$$

Since the direction of the vector $V_1$ is the same as that of the vector $V_R$, the vector $V_1$ is determined as follows:

$$V_1 = \frac{R\{(V_T, V_M) + |V_T \times V_M| - 1\}}{|V_R|} \cdot V_R \quad (6)$$

Then, a vector $V_2$ is determined. Based on the following equation:

$$\begin{aligned}
|V_2|^2 &= (\sqrt{2} R)^2 - l^2 \quad (7) \\
&= 2R^2 - \{(R + R \cdot \tan \theta) \cdot \cos \theta\}^2 \\
&= 2R^2 - \{R\cos \theta (1 + \tan \theta)\}^2 \\
&= 2R^2 - \left\{R\cos \theta \left(1 + \frac{\sin \theta}{\cos \theta}\right)\right\}^2 \\
&= 2R^2 - \{R(\cos \theta + \sin \theta)\}^2 \\
&= 2R^2 - R^2(\sin^2 \theta + \cos^2 \theta) - 2R^2\cos \theta \cdot \sin \theta \\
&= R^2 - 2R^2\cos \theta \cdot \sin \theta \\
&= R^2\{1 - 2(V_T, V_M) \cdot |V_T \times V_M|\},
\end{aligned}$$

the magnitude of the vector $V_2$ is determined according to the following equation:

$$|V_2| = R\sqrt{1 - 2(V_T, V_M) \cdot |V_T \times V_M|}. \quad (8)$$

Inasmuch as the direction of the vector $V_2$ is the same as that of a motion vector:

$-V_M$, the vector $V_2$ is determined according to the following equation:

$$V_2 = -R\sqrt{\{1 - 2(V_T, V_M) \cdot |V_T \times V_M|\}} \cdot V_M. \quad (9)$$

A vector $V_3$ has its magnitude equal to the radius D and its direction indicated by:

$$(V_M \times V_T) \times V_T. \quad (10)$$

Therefore, the vector $V_3$ is determined according to the following equation:

$$V_3 = \frac{D}{|(V_M \times V_T) \times V_T|} \cdot \{(V_M \times V_T) \times V_T\}. \quad (11)$$

Therefore, the cutter compensation vector is determined from the vectors $V_1$, $V_2$, $V_3$ according to the following equation:

$$\begin{aligned} V_C &= V_1 + V_2 + V_3 \quad (12) \\ &= \frac{R\{(V_T, V_M) + |V_T \times V_M| - 1\}}{|V_R|} \cdot V_R - \\ &\quad R\sqrt{\{1 - 2(V_T, V_M) \cdot |V_T \times V_M|\}} \cdot V_M + \\ &\quad \frac{D}{|(V_M \times V_T) \times V_T|} \cdot \{(V_M \times V_T) \times V_T\}. \end{aligned}$$

When the radius R of the arc is set to R=0, it is possible to determine a cutter compensation vector for an ordinary end mill with no round edge. Specifically, when R=0, the cutter compensation vector $V_C$ is equal to the vector $V_3$, i.e., $$V_C = V_3, \quad (13)$$

and a cutter compensation vector for an ordinary end mill can be determined using the equation (12).

While the method of calculating the cutter compensation vector in the condition represented by:

$$(V_M, V_T) \geq 0 \quad (14)$$

has been described in the example shown in FIG. 3, a cutter compensation vector in a condition represented by:

$$(V_M, V_T) < 0 \quad (15)$$

can also be determined according to the same process as described above.

Figure 4:
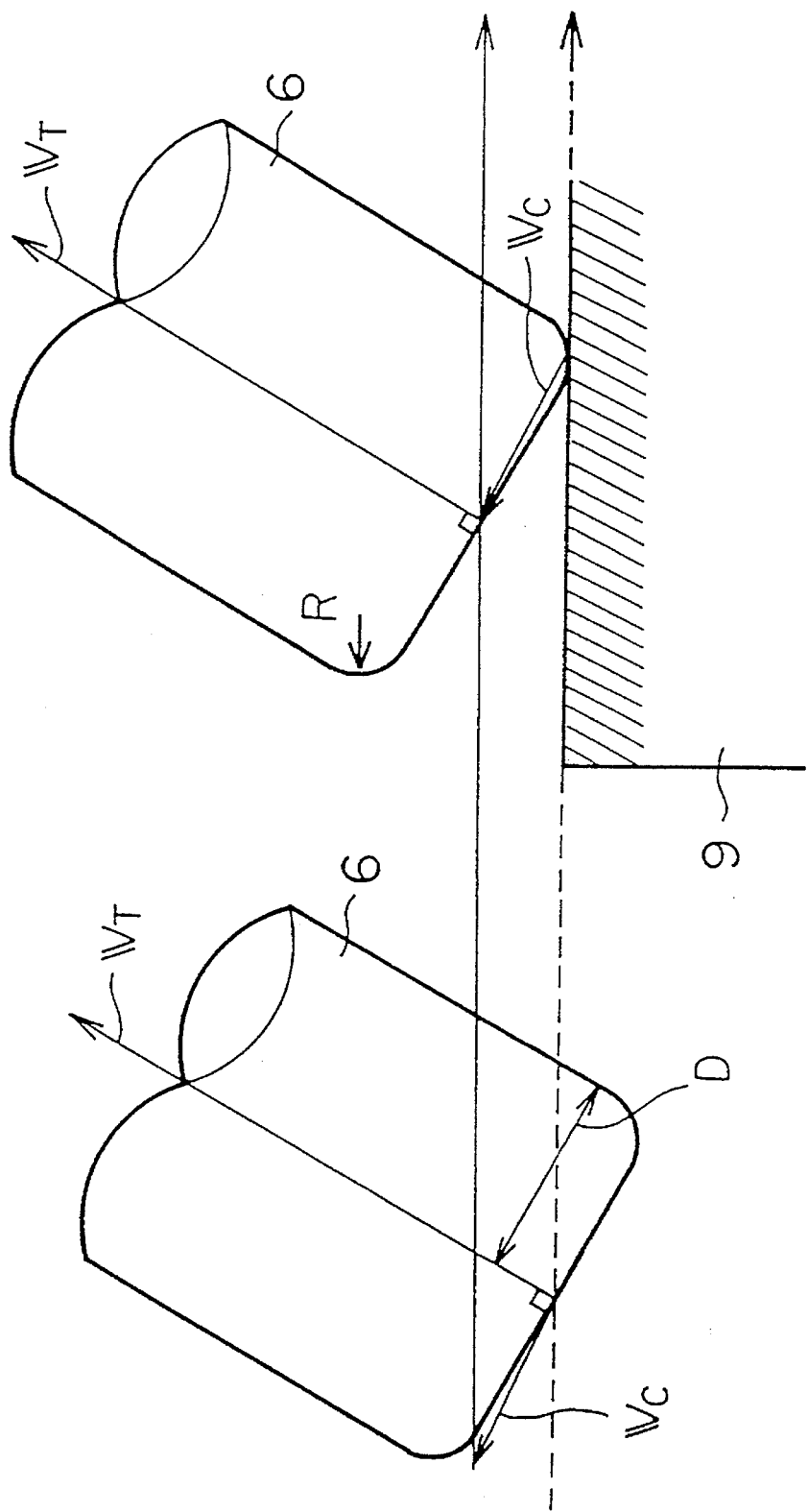
FIG. 4 is a view illustrative of the manner in which a cutter compensated for by the cutter compensation vector moves.

FIG. 4 is illustrative of the manner in which the cutter 6 compensated for by the cutter compensation vector determined as described above moves. In FIG. 4, the broken-line arrow indicates a programmed path for the cutter 6, and the solid-line arrow indicates a compensated path which is shifted parallel to the programmed path outwardly from the workpiece 9 by the cutter compensation vector.

Cutter compensation is carried out by determining the cutter axis direction from the present positions of the B- and C-axes, and shifting the cutter 6 onto a line at the intersection of a plane formed by the cutter axis direction and the direction of travel of the cutter and a plane perpendicular to the cutter axis direction, by a distance which is determined taking into account the radius D of the cutter 6 and the radius R of the arc of the edge of the cutter 6. The compensated path is interpolated by an interpolating means to enable the edge of the cutter 6 to machine the workpiece 9.

Figure 5:
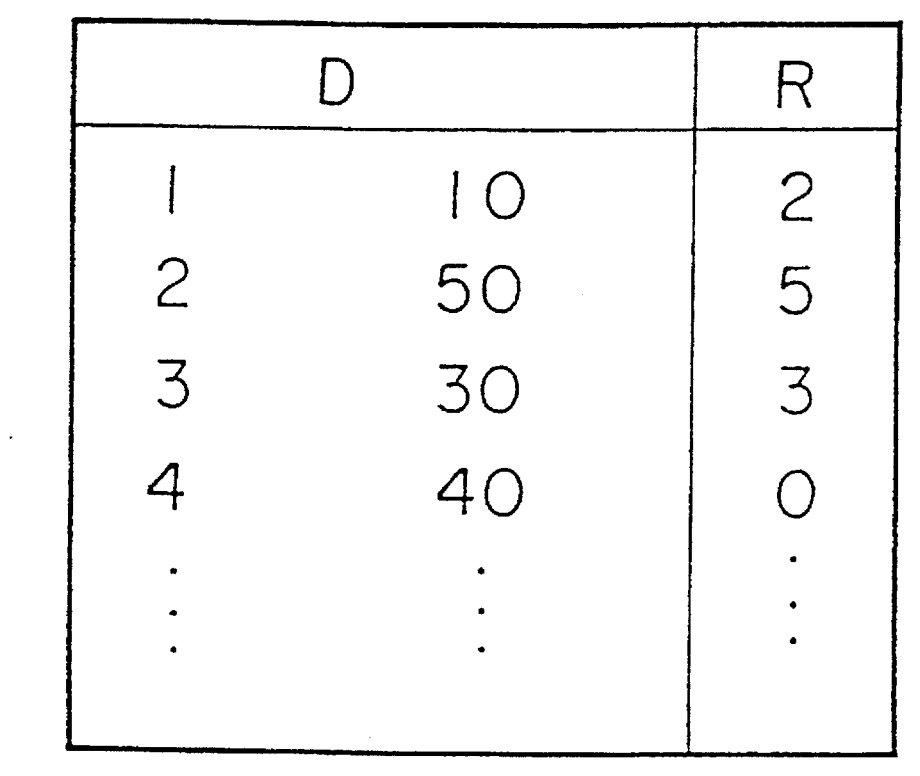

FIG. 5 shows an example of the cutter offset memory which stores cutter offsets. As shown in FIG. 5, offset numbers and cutter radii (expressed in mm) are stored in the column of D codes, and radii R (expressed in mm) corresponding to the respective offset numbers are stored in the column of radii R of arcs of end mills. The radius R which is of a value 0 indicates an end mill whose edge is not round, and the radii R which are of other values indicate end mills whose edges are round.

Figure 6:
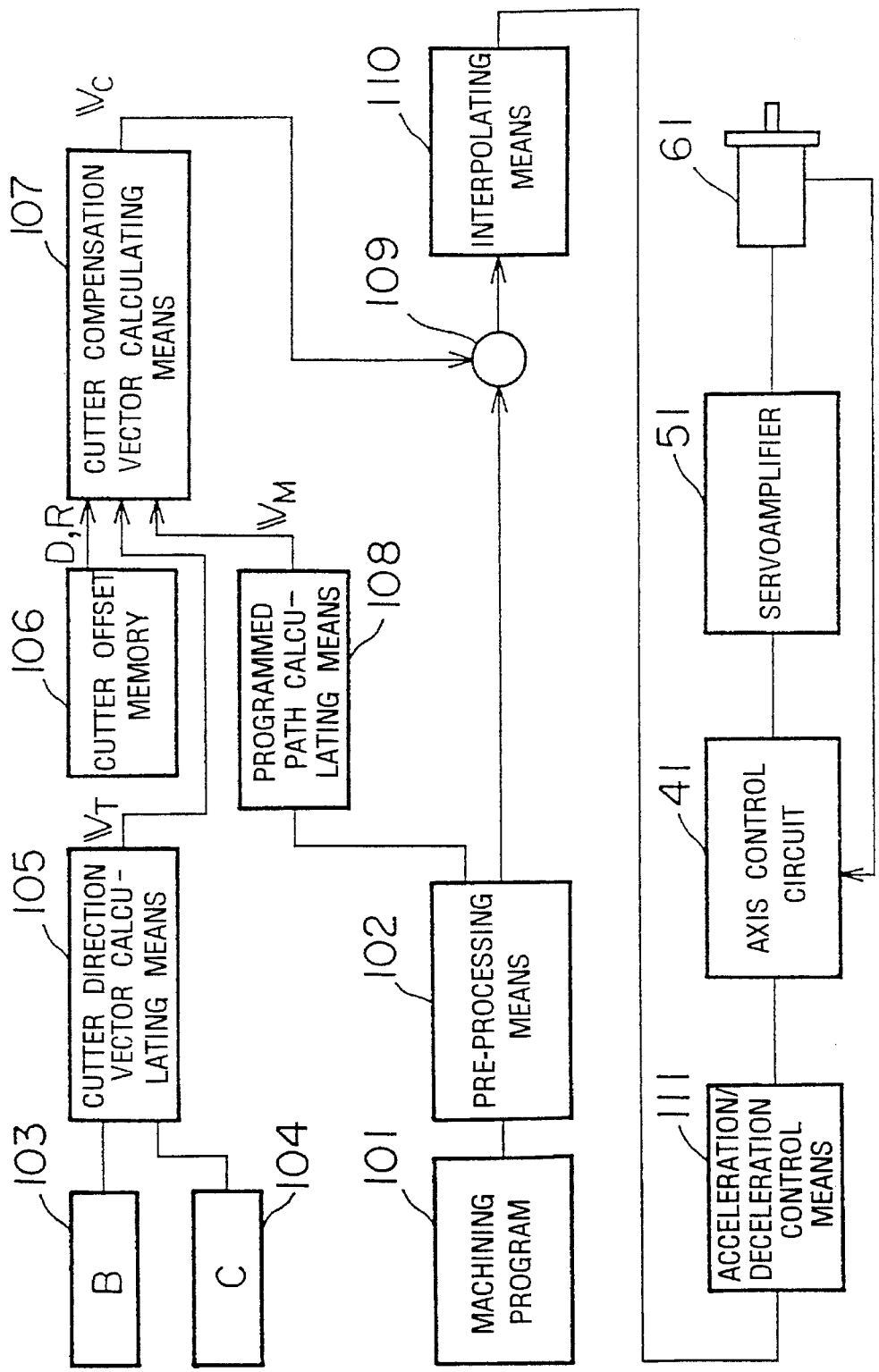
FIG. 6 is a block diagram of an embodiment of the cutter compensation system for machining a workpiece with a round edge of a cutter.

FIG. 6 shows in block form an embodiment of the cutter compensation system for machining a workpiece with a round edge of a cutter. Each of the blocks of the embodiment of the cutter compensation system is implemented by the software program of a numerical control apparatus (described later on).

As shown in FIG. 6, a pre-processing means 102 reads a machining program 101, and sends a motion command to an adder 109. If there is a cutter compensation command in the machining program 101, then the pre-processing means 102 sends the cutter compensation command to various blocks described below. A cutter direction vector calculating means 105 reads the present position of the B-axis which controls the rotary head 5 from a register 103, reads the present position of the C-axis which also controls the rotary head 5 from a register 104, and determines a cutter direction vector of the cutter 6.

A programmed path calculating means 108 reads the motion command sent from the pre-processing means 102, and calculates a motion vector in the direction in which the cutter 6 travels.

A cutter compensation vector calculating means 107 determines a cutter compensation vector from the cutter direction vector that is supplied from the cutter direction vector calculating means 105, a cutter radius D and a radius R of the arc of the edge which are stored in the cutter offset memory 106, and the motion vector that is supplied from the programmed path calculating means 108.

The adder 109 adds the cutter compensation vector to the programmed path, thus determining a compensated path. The interpolating means 110 determines a distance to be traversed from the compensated path, and interpolates the distance.

Interpolated distribution pulses are accelerated or decelerated by acceleration/deceleration control means 111, and delivered to an axis control circuit 41. The axis control circuit 41 converts the distribution pulses into a speed control signal, and supplies the speed control signal to a servoamplifier 51. The servoamplifier 51 amplifies the supplied speed control signal, and energizes a servomotor 61 with the amplified speed control signal. The servomotor 61 has a built-in pulse coder for detecting its angular displacement. The pulse coder supplies position feedback pulses to the axis control circuit 41.

In FIG. 6, the acceleration/deceleration control means 111, the axis control circuit 41, the servoamplifier 51, and the servomotor 61 are shown in a combination for one axis only. They are actually required in combinations for a total of 5 axes, but those in combinations for the other 4 axes are omitted from illustration as they are identical to those shown in FIG. 6.

Figure 7:
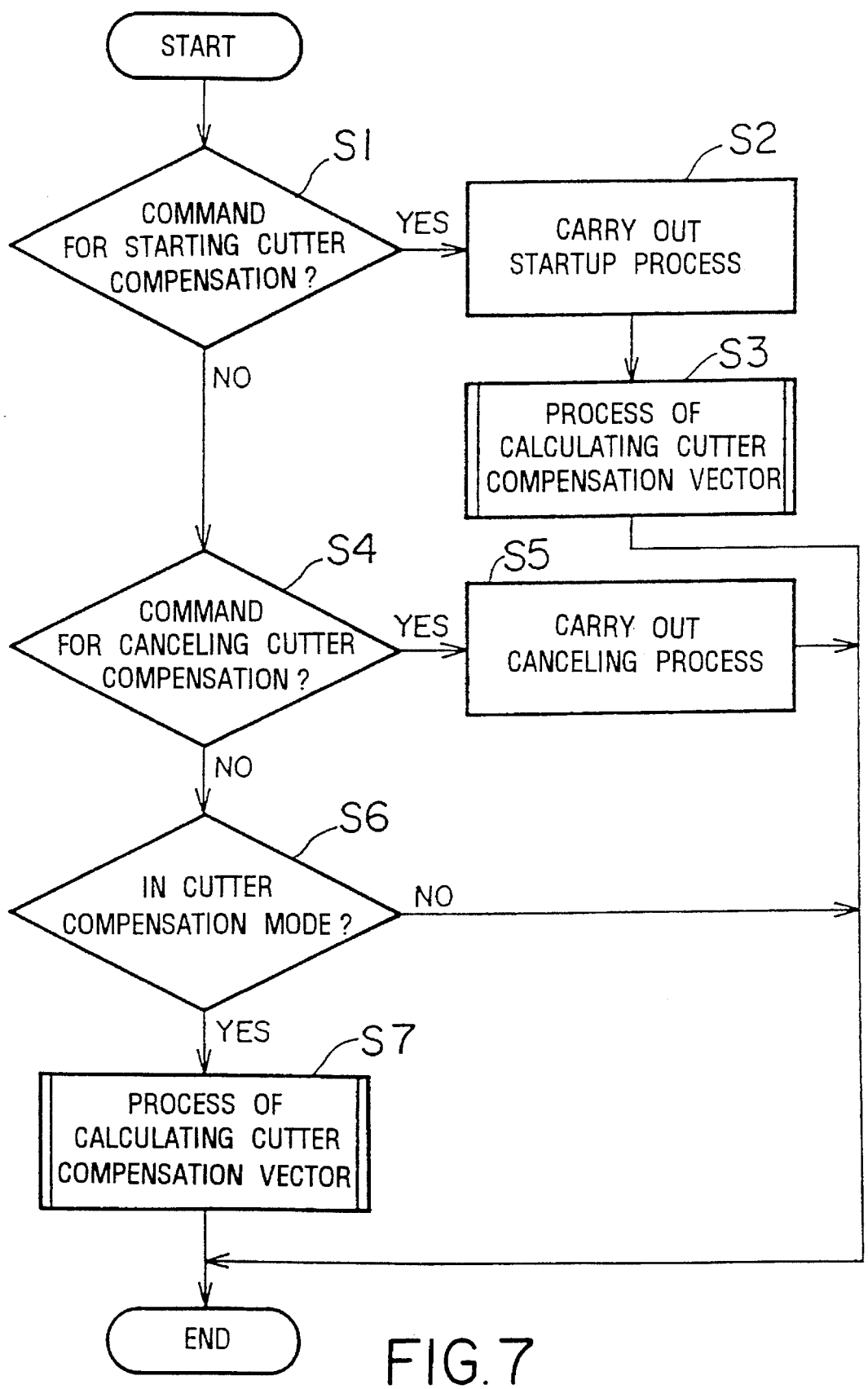
FIG. 7 is a flowchart of a processing sequence of the cutter compensation system.
Figure 8:
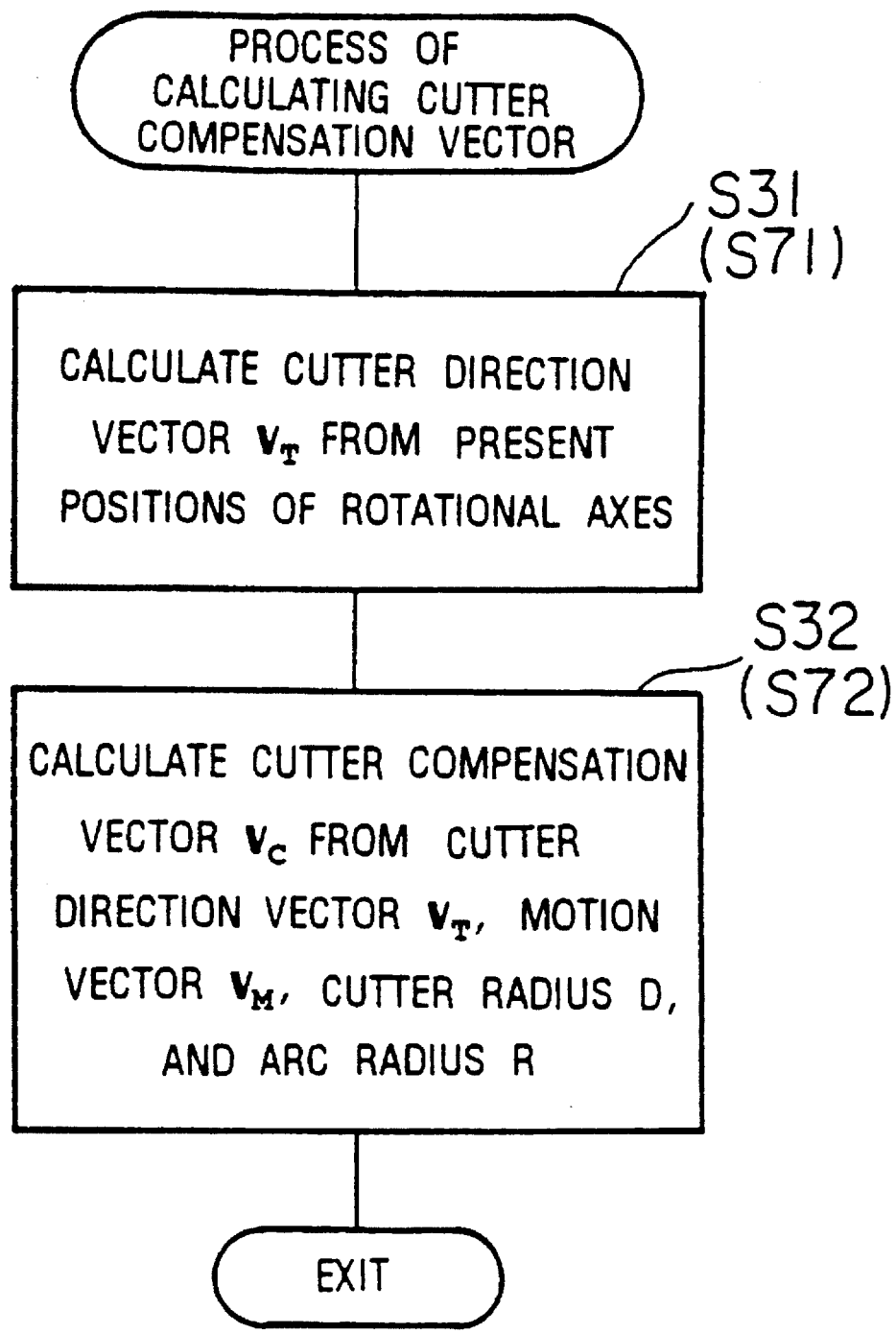
FIG. 8 is a flowchart of a subroutine of the processing sequence of the cutter compensation system.

FIGS. 7 and 8 are flowcharts of a processing sequence of the cutter compensation system according to the present invention. In FIGS. 7 and 8, numerical values following "S" represent step numbers.

[S1] The pre-processing means 102 reads the machining program and determines whether there is a startup command for starting cutter compensation in the machining program or not. If there is a startup command for starting cutter compensation, then control goes to a step S2. If there is no startup command for starting cutter compensation, then control goes to a step S4.

[S2] Since there is a startup command, a startup process is carried out. Specifically, a cutter radius D of a cutter 6 indicated by the startup command and a radius R of the arc of the edge of the cutter 6 are read from the cutter offset memory 106.

[S3] A subroutine process of calculating a cutter compensation vector as shown in FIG. 8 is carried out as follows:

[S31] A cutter direction vector is calculated from the present positions of the rotational axes which are stored in the registers 103, 104.

[S32] The cutter compensation vector calculating means 107 calculates a cutter compensation vector from the cutter direction vector that is supplied from the cutter direction vector calculating means 105, the motion vector that is supplied from the programmed path calculating means 108, and the cutter radius D and the arc radius R that are read from the cutter offset memory 106.

[S4] It is determined whether there is a command for canceling the cutter compensation or not. If there is a command for canceling the cutter compensation, then control goes to a step S5. If there is no command for canceling the cutter compensation, then control proceeds to a step S6.

[S5] Since there is a command for canceling the cutter compensation, the cutter compensation vector is canceled.

[S6] It is determined whether the cutter compensation system is in a cutter compensation mode or not. If the cutter compensation system is in a cutter compensation mode, then control proceeds to a step S7. If the cutter compensation system is not in a cutter compensation mode, then control goes to end.

[S7] The subroutine process of calculating a cutter compensation vector as shown in FIG. 8 is carried out as follows:

[S71] A cutter direction vector is calculated from the present positions of the rotational axes which are stored in the registers 103, 104.

[S72] The cutter compensation vector calculating means 107 then calculates a cutter compensation vector from the cutter direction vector that is supplied from the cutter direction vector calculating means 105, the motion vector that is supplied from the programmed path calculating means 108, and the cutter radius D and the arc radius R that are read from the cutter offset memory 106.

Figure 9:
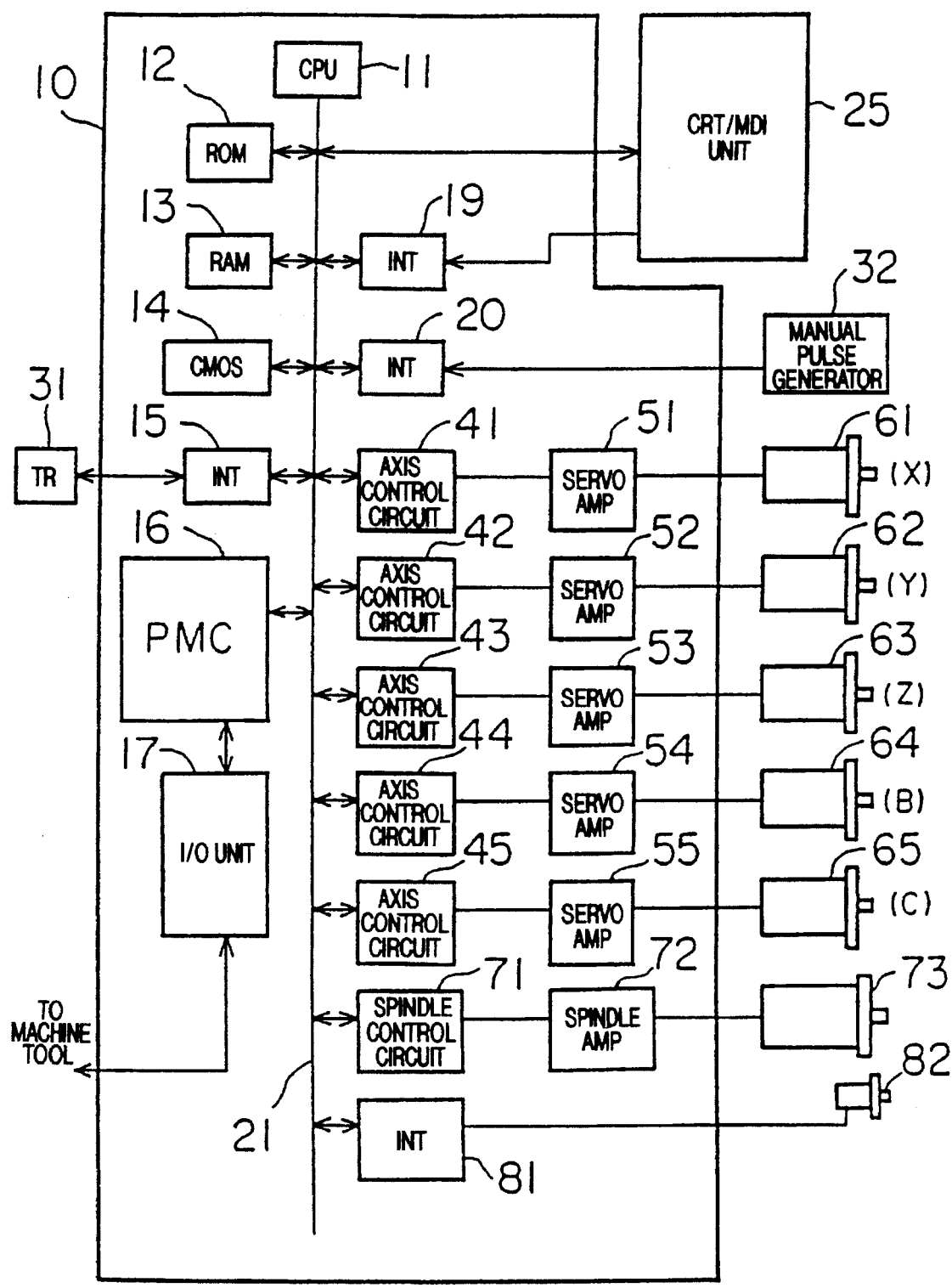
FIG. 9 is a block diagram of a hardware arrangement of a computerized numerical control apparatus which incorporates the cutter compensation system according to the present invention.

FIG. 9 shows in block form a hardware arrangement of a computerized numerical control (CNC) apparatus which incorporates the cutter compensation system according to the present invention. As shown in FIG. 9, the computerized numerical control apparatus is indicated by the reference numeral 10. The computerized numerical control apparatus 10 has a central processor 11 for controlling the computerized numerical control apparatus 10 in its entirety. The central processor 11 reads a system program stored in a read-only memory 12 through a bus 21, and executes control over the computerized numerical control apparatus 10 in its entirety according to the system program. A random-access memory 13 stores temporary calculated data and display data. A nonvolatile memory 14 stores cutter compensation quantities, pitch error compensation quantities, a machining program, and parameters. The nonvolatile memory 14 is backed up by a battery (not shown), so that the stored data will be retained in the event of a power failure of the computerized numerical control apparatus 10.

An interface 15 for interfacing the computerized numerical control apparatus 10 with an external device 31 which may be a tape reader, a tape puncher, or a tape reader/puncher. A machining program may be read from the external device 31 which comprises a tape reader through the interface 15, and a machining program edited in the computerized numerical control apparatus 10 can be outputted to the external device 31 which comprises a tape puncher through the interface 15.

A programmable machine controller (PMC) 16 is provided in the computerized numerical control apparatus 10 for controlling a machine tool according to a sequence program which is generated in ladder form. Specifically, the programmable machine controller 16 converts an M function (miscellaneous function), an S function (spindle function), and a T function (cutter selecting function) which are commanded by the machining program, into signals required by the machine tool according to the sequence program, and outputs the converted signals from an input/output unit 17. The outputted signals are supplied to energize electromagnets on the machine tool and operates hydraulic valves, pneumatic valves, and electric actuators. The programmable machine controller 16 also processes signals from limit switches on the machine tool and switches on a machine control console, and delivers the processed signals to the processor 11.

Image signals representing the present positions of the axes, alarms, parameters, and image data are sent to a display device of a CRT/MDI (Cathode-Ray Tube/Manual Data Input) unit 25, and displayed on the display device. An interface 19 receives data from a keyboard in the CRT/MDI unit 25, and delivers the received data to the processor 11.

An interface 20 is connected to a manual pulse generator 32 for receiving pulses generated by the manual pulse generator 32. The manual pulse generator 32 is mounted on the machine control console for manually positioning mechanical operable parts accurately.

Axis control circuits 41~45 receive motion commands for the respective axes from the processor 11, and output commands for the respective axes to servoamplifiers 51~55, respectively. In response to the commands, the servoamplifiers 51~55 energize respective servomotors 61~65 for the X-, Y-, Z-, B-, and C-axes. The servomotors 61~65 have built-in pulse coders for detecting angular displacements thereof. These pulse coders feed back positional signals as pulse trains. Feedback lines for these positional signals are omitted from illustration in FIG. 9.

A spindle control circuit 71 receives a spindle rotation command and a spindle orientation command, and outputs a spindle speed signal to a spindle amplifier 72. In response to the spindle speed signal, the spindle amplifier 72 energizes a spindle motor 73 to rotate a spindle connected thereto at a rotational speed commanded by the spindle rotation command. The spindle amplifier 72 also positions the spindle at a position indicated by the spindle orientation command.

A position coder 82 is coupled to the spindle motor 73 through gears or a belt. The position coder 82 rotates in synchronism with the spindle motor 73, outputs feedback pulses through an interface 81 to the processor 11 which reads the feedback pulses. The feedback pulses serve to move the other axes synchronously with the spindle motor 73 to make it possible to effect precision machining.

While the rotary head is tilted to control the tilt of the cutter in the above embodiment, a table may be tilted to tilt the cutter relative to the surface of the workpiece. In such a modification, a cutter compensation vector is calculated from the present positions of axes which control the table.

According to the present invention, as described above, when a cutter is tilted to machine a workpiece with an edge or a round edge of the cutter, the numerical control apparatus automatically effects cutter compensation in a plane perpendicular to the cutter axis. Therefore, no automatic programming apparatus is required. Since it is not necessary to carry out cutter compensation at the time a program is generated, the program is simplified, the amount of program software is reduced, the time consumed to generate the program is shortened, the storage area of a memory for storing the program is saved, and a workpiece can be cut or machined in a more appropriate manner.

We claim:

1. A three-dimensional cutter compensation system for numerically controlling a machine tool in response to a machining program to machine a workpiece, comprising:

a cutter of predetermined radius attached to said numerically controlled machine tool wherein said cutter is tiltable in three-dimensional space in response to a plurality of control axes;

cutter direction vector calculating means for calculating a cutter direction vector from said plurality of control axes;

a cutter offset memory for storing the cutter radius and a radius of an arc of an edge of the cutter;

programmed path calculating means for calculating a programmed path commanded by the machining program; and cutter compensation vector calculating means for calculating a cutter compensation vector from the cutter direction vector, the cutter radius and the radius of the arc of the edge of the cutter which are stored in said cutter offset memory, and the programmed path.

2. A three-dimensional cutter compensation system according to claim 1, wherein the radius of the arc of the edge of the cutter which is stored in said cutter offset memory is zero if the edge of the cutter is not round.

3. A three-dimensional cutter compensation system according to claim 1, wherein said control axes controlling the tilt of the cutter comprise a B-axis for rotating the cutter about a Y-axis and a C-axis for rotating the cutter about a Z-axis, and wherein said cutter direction vector calculating means comprises means for calculating the cutter direction vector from present positions of the B- and C-axes.

4. A three-dimensional cutter compensation system for machining a workpiece in response to a machining program, comprising:

a cutter which is movable about X, Y, and Z axes and is tiltable about a B axis, said cutter having a predetermined radius;

a memory which stores the present position of the X, Y, Z, and B axes of the cutter and the cutter radius;

cutter direction vector calculating means which calculates a cutter direction vector from the present position of the X, Y, Z, and B axes of the cutter stored in said memory;

programmed path calculating means which calculates a programmed path for said cutter in response to said machining program; and cutter compensation vector calculating means which calculates a cutter compensation vector in response to the cutter direction vector received from said cutter direction vector calculating means, the cutter radius received from said memory, and the programmed path received from said programmed path calculating means.

5. The three-dimensional cutter compensation system according to claim 4 wherein:

said cutter is tiltable about a C axis and said memory stores the present position of the C axis; and said cutter direction vector calculating means calculates the cutter direction vector from the present position of the X, Y, Z, B, and C axes stored in said memory.

6. The three-dimensional cutter compensation system according to claim 5 further comprising:

a plurality of servomotors connected to and controlling the position of said cutter about the X, Y, Z, B, and C axes;

preprocessing means which converts said machining program into a motion command; and interpolation means which receives the cutter compensation vector from said cutter compensation vector calculating means and the motion command from said preprocessing means and controls said plurality of servomotors in response thereto thereby controlling the position of said cutter about the X, Y, Z, B, and C axes.

7. The three-dimensional cutter compensation system according to claim 5 wherein:

said cutter has an edge having a predetermined arc radius;

said memory stores the predetermined arc radius of the cutter edge; and said cutter direction vector calculating means calculates the cutter direction vector from the present position of the X, Y, Z, B, and C axes of the cutter, said cutter radius and the predetermined arc radius of the cutter edge stored in said memory.

8. A method for three-dimensional cutter compensation which numerically controls a tiltable cutter of predetermined radius in three-dimensional space in response to a machining program, comprising the steps of:

reading positional information corresponding to a plurality of cutter control axes for controlling tilt of the tiltable cutter from memory;

calculating a cutter direction vector from said plurality of cutter control axes;

calculating a cutter motion vector corresponding to a direction of travel of the cutter in response to the machining program;

reading a radius of the cutter and a radius of an arc of an edge of the cutter from memory;

calculating a cutter compensation vector from the cutter direction vector, the cutter motion vector, the cutter radius read from memory, and the radius of the arc of the edge of the cutter read from memory.

9. The method according to claim 8 wherein the reading step further comprises the step of:

reading B, and C control axes for controlling tilt of the tiltable cutter.

* * * * *

UNITED STATES PATENT AND TRADEMARK OFFICE
CERTIFICATE OF CORRECTION

PATENT NO. : 5,563,484
DATED : October 8, 1996
INVENTOR(S) : Toshiaki OTSUKI, et al.

It is certified that error appears in the above-indentified patent and that said Letters Patent is hereby corrected as shown below:

Col. 1, line 47, change "Therefore" to --It is therefore--
Col. 4, line 15, change "$C_c$" to --$V_c$--
      line 21, change "1" to --$\ell$--
      line 29, equation (4c) change "1" to --$\ell$--
      line 31, equation 5, line 1, change "1" to --$\ell$--
      line 47, equation 7, line 1, change "1²" to --$\ell^2$--
Col. 5, line 54, change "i s" to --is--

Signed and Sealed this

Fourteenth Day of January, 1997

Attest:

BRUCE LEHMAN

Attesting Officer     Commissioner of Patents and Trademarks